United States Patent
Kim

(10) Patent No.: US 10,718,227 B2
(45) Date of Patent: Jul. 21, 2020

(54) BLADE TIP CLEARANCE CONTROL APPARATUS FOR GAS TURBINE

(71) Applicant: DOOSAN HEAVY INDUSTRIES & CONSTRUCTION CO., LTD., Changwon-si, Gyeongsangnam-do (KR)

(72) Inventor: Yeong Chun Kim, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 32 days.

(21) Appl. No.: 16/194,386

(22) Filed: Nov. 18, 2018

(65) Prior Publication Data

US 2019/0195081 A1 Jun. 27, 2019

(30) Foreign Application Priority Data

Dec. 21, 2017 (KR) .................. 10-2017-0177080

(51) Int. Cl.
   - *F01D 11/22* (2006.01)
   - *F01D 25/16* (2006.01)
   - *F01D 25/24* (2006.01)

(52) U.S. Cl.
   CPC ............ *F01D 11/22* (2013.01); *F01D 25/168* (2013.01); *F01D 25/24* (2013.01);
   (Continued)

(58) Field of Classification Search
   CPC ..... F01D 3/00; F01D 3/04; F01D 3/11; F01D 3/025; F01D 3/06; F01D 3/08; F01D 3/14;
   (Continued)

(56) References Cited

U.S. PATENT DOCUMENTS

| | | | | |
|---|---|---|---|---|
| 3,453,032 A | * | 7/1969 | Oberle .................. | F01D 21/08 384/124 |
| 3,975,901 A | * | 8/1976 | Hallinger ............... | F01D 11/24 60/786 |
| 4,309,144 A | * | 1/1982 | Eggmann ............... | F01D 3/04 415/105 |

FOREIGN PATENT DOCUMENTS

| | | |
|---|---|---|
| JP | 02-218801 A | 8/1990 |
| JP | H07-004903 A | 1/1995 |
| | (Continued) | |

OTHER PUBLICATIONS

A Korean Office Action dated Mar. 18, 2019 in connection with Korean Patent Application No. 10-2017-0177080 which corresponds to the above-referenced U.S. application.

(Continued)

*Primary Examiner* — Igor Kershteyn
(74) *Attorney, Agent, or Firm* — Invenstone Patent, LLC

(57) ABSTRACT

A blade tip clearance control apparatus is disclosed. The apparatus includes a rotor, a hydraulic clearance control device, and a cylinder locking device. The rotor includes a thrust collar, a pair of thrust bearings axially supporting the thrust collar, and a plurality of radially extending blades. The hydraulic clearance control device includes a first hydraulic cylinder moving any one of the pair of thrust bearings in a forward axial direction and a second hydraulic cylinder moving the other thrust bearing in the reverse axial direction. The cylinder locking device includes a first locking device restricting a forward moving distance of the first hydraulic cylinder and a second locking device restricting a reverse moving distance of the second hydraulic cylinder.

29 Claims, 13 Drawing Sheets

(52) U.S. Cl.
CPC ...... *F05D 2240/11* (2013.01); *F05D 2240/52* (2013.01); *F05D 2250/182* (2013.01); *F05D 2270/44* (2013.01); *F05D 2270/46* (2013.01); *F05D 2270/56* (2013.01); *F05D 2270/64* (2013.01); *F05D 2270/706* (2013.01)

(58) Field of Classification Search
CPC . F01D 3/20; F01D 3/22; F01D 25/168; F01D 25/24; F05D 2240/11; F05D 2240/52; F05D 2250/182; F05D 2260/36; F05D 2270/706; F05D 2270/64; F05D 2270/46; F05D 2270/44
See application file for complete search history.

(56) References Cited

FOREIGN PATENT DOCUMENTS

| | | | |
|---|---|---|---|
| JP | 2002529646 | A | 9/2002 |
| JP | 5955176 | B2 | 7/2016 |
| KR | 10-1327101 | B1 | 11/2013 |

OTHER PUBLICATIONS

A Korean Office Action dated Jun. 27, 2019 in connection with Korean Patent Application No. 10-2017-0177080 whhich corresponds to the above-referenced U.S. application.

\* cited by examiner

[FIG. 1]
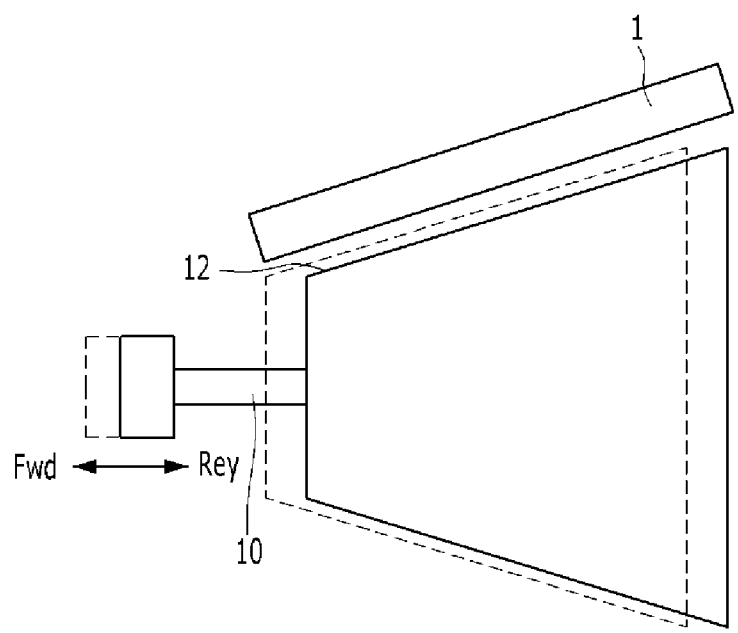

[FIG. 2]
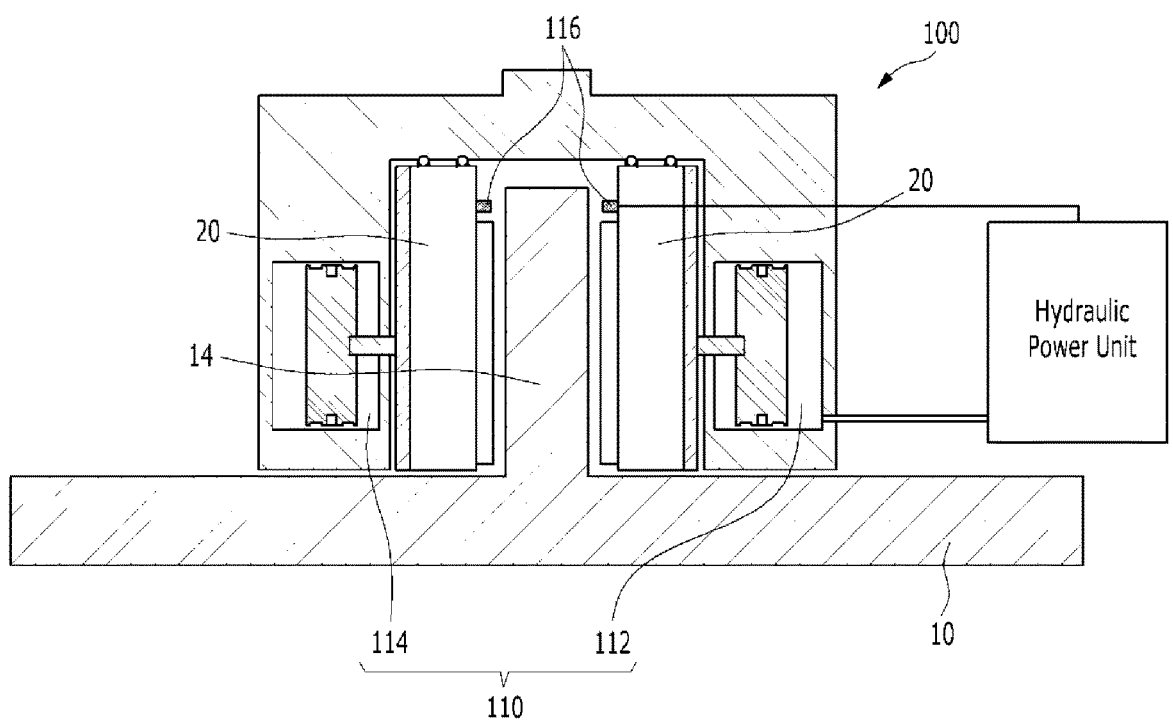
PRIOR ART

[FIG. 3]
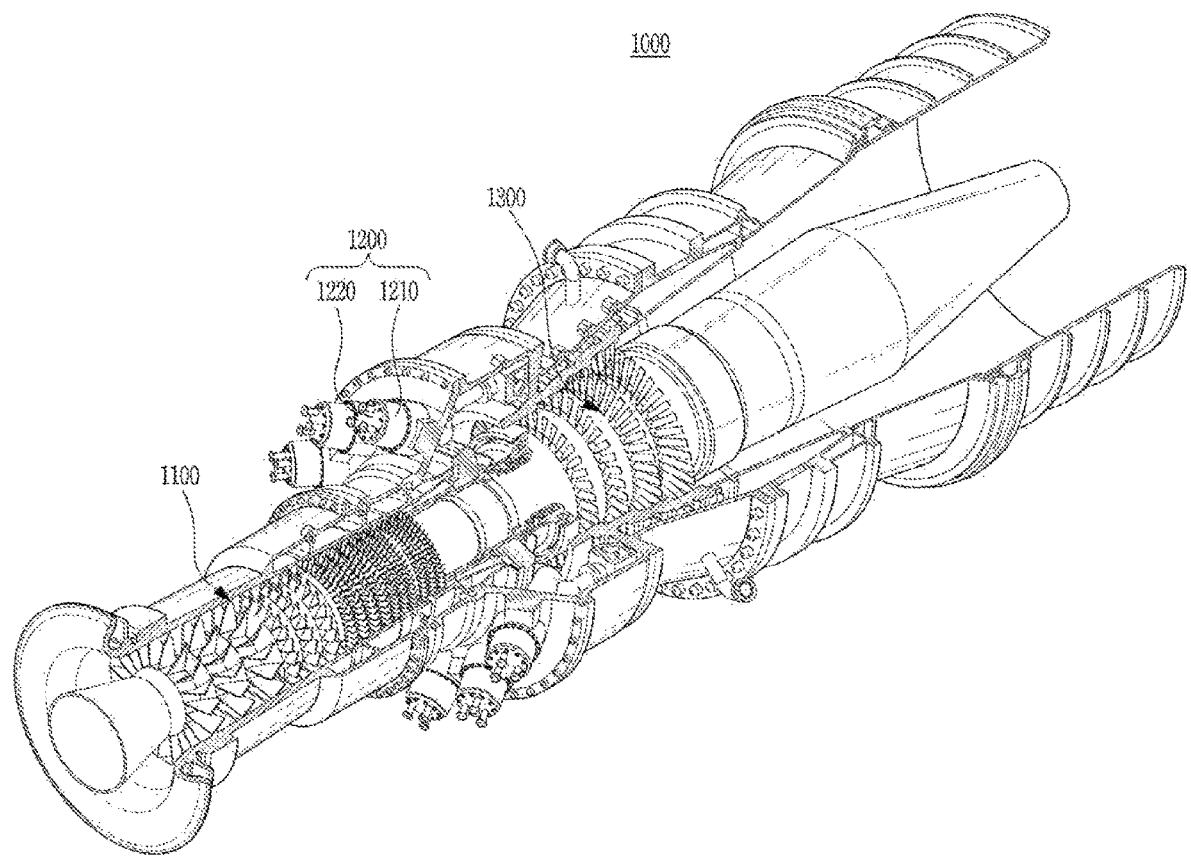

[FIG. 4]
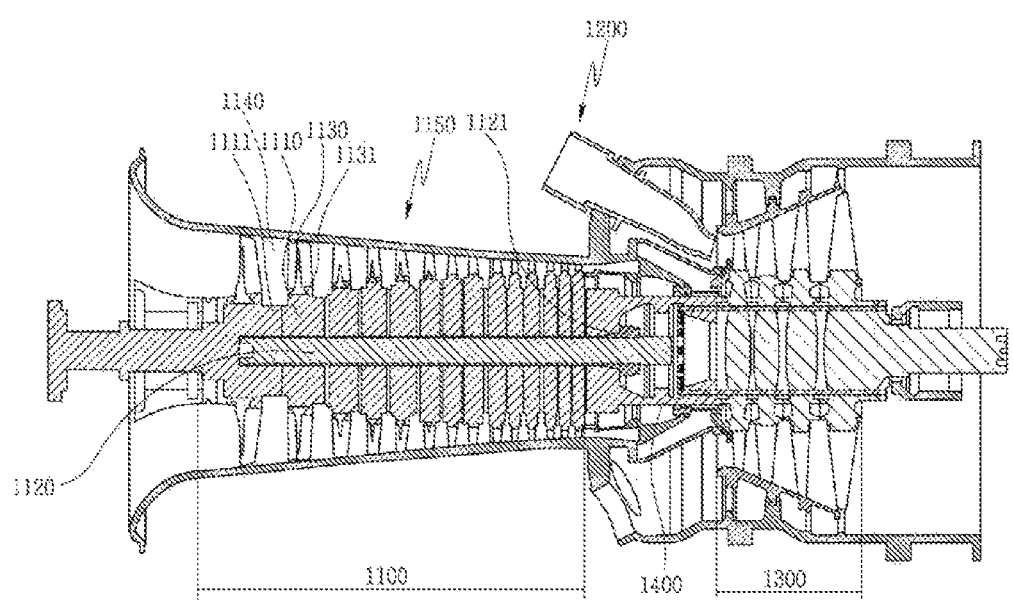

[FIG. 5]
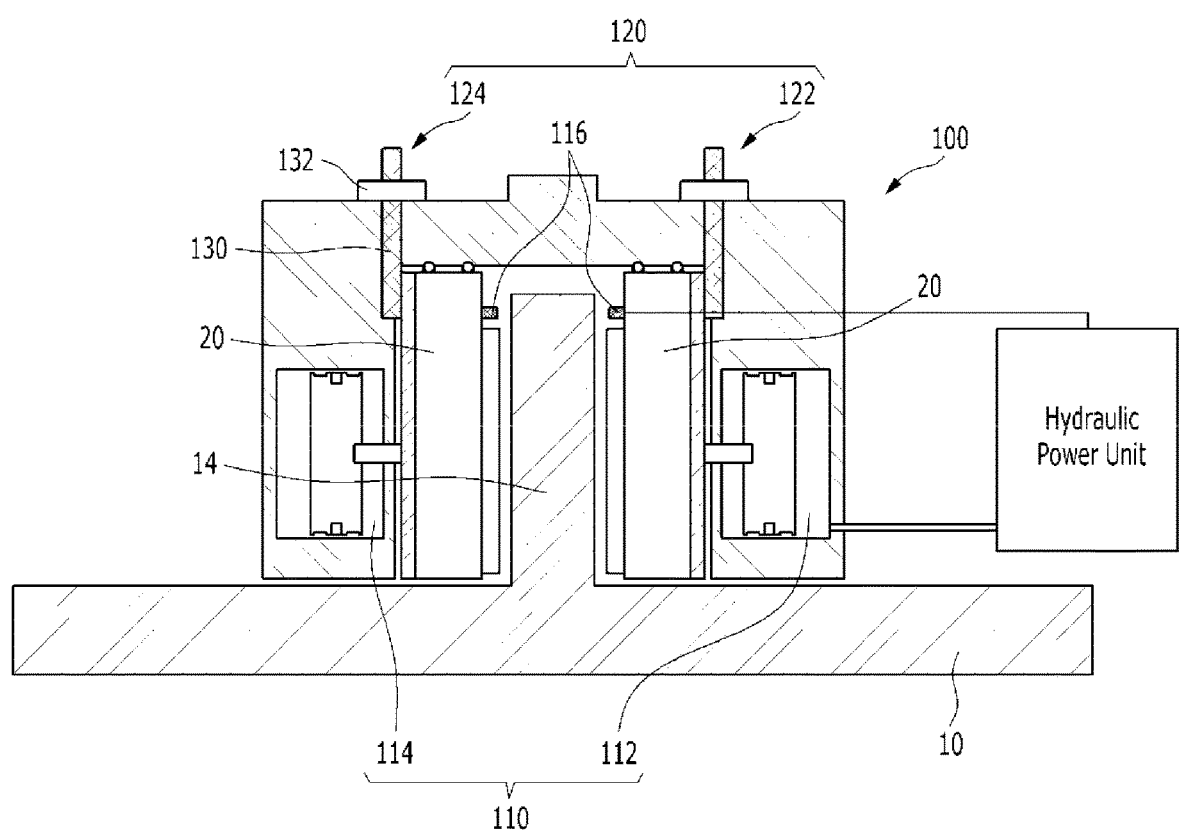

[FIG. 6]
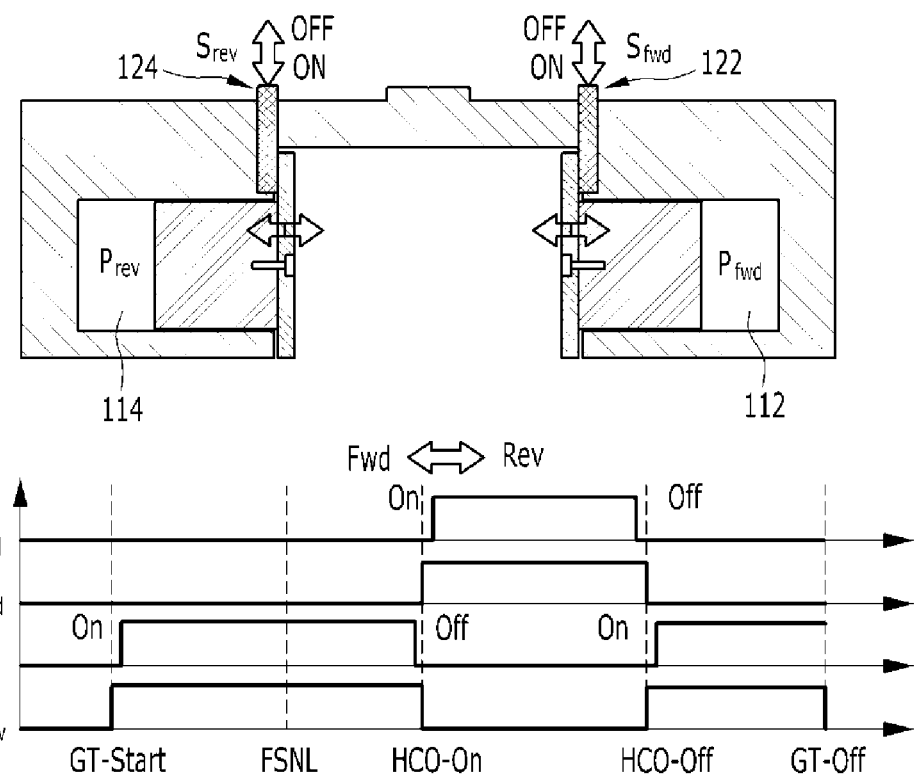

【FIG. 7】
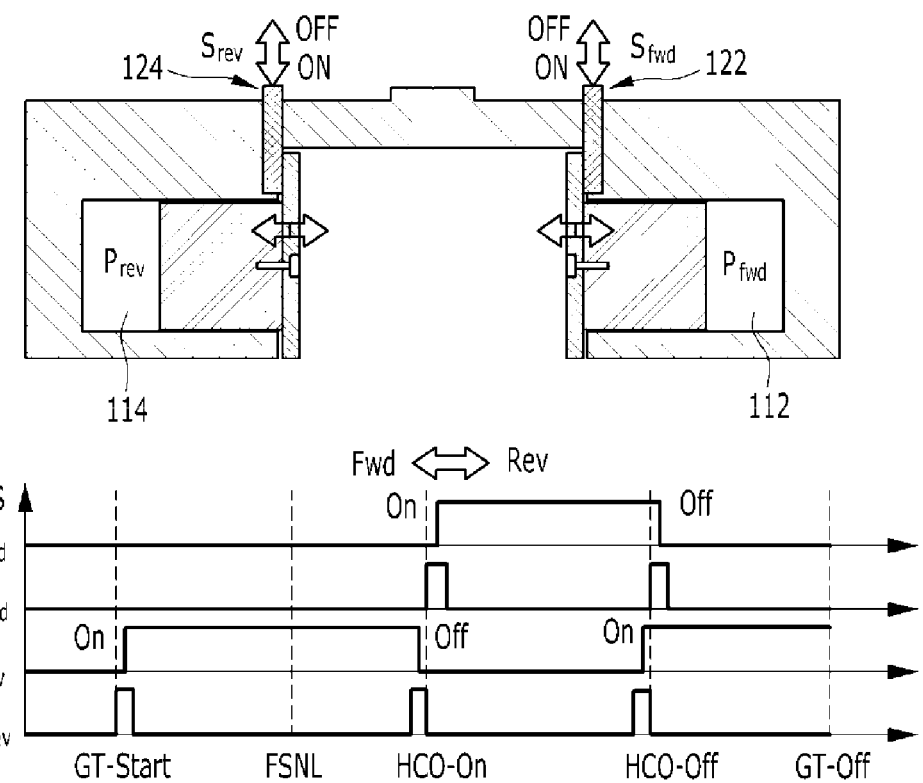

[FIG. 8]
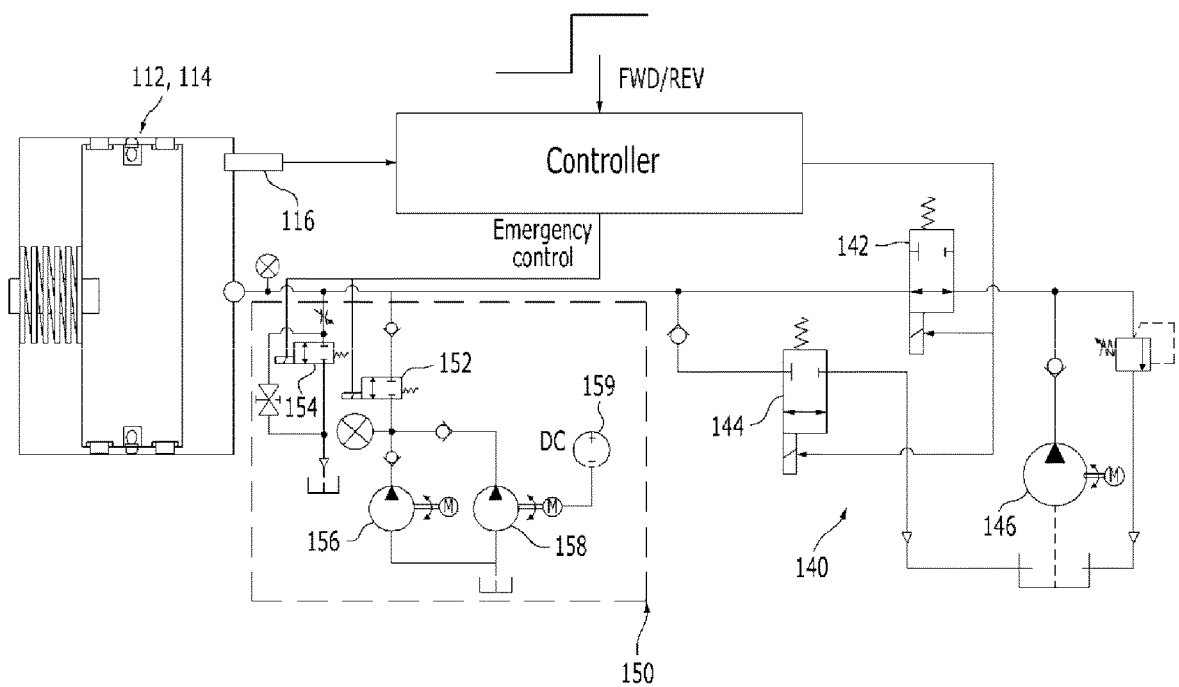

[FIG. 9]
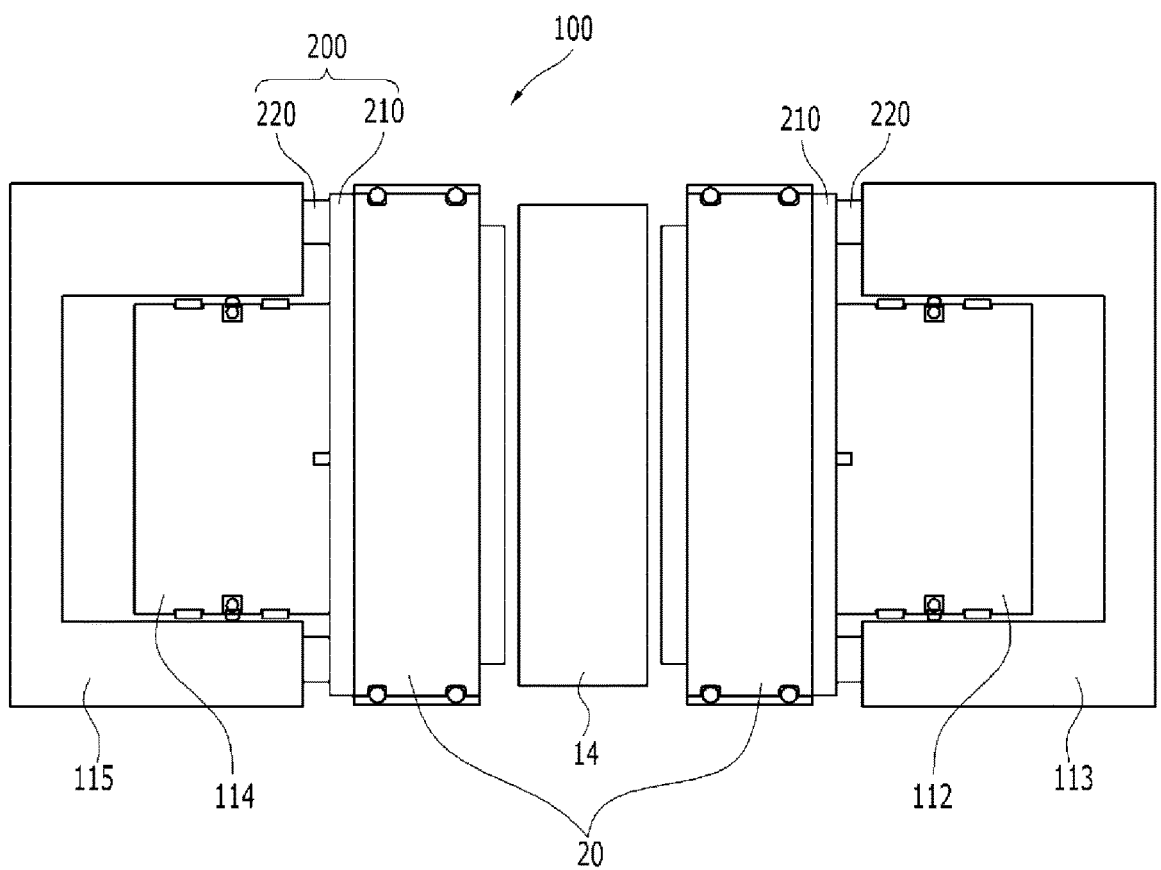

[FIG. 10]
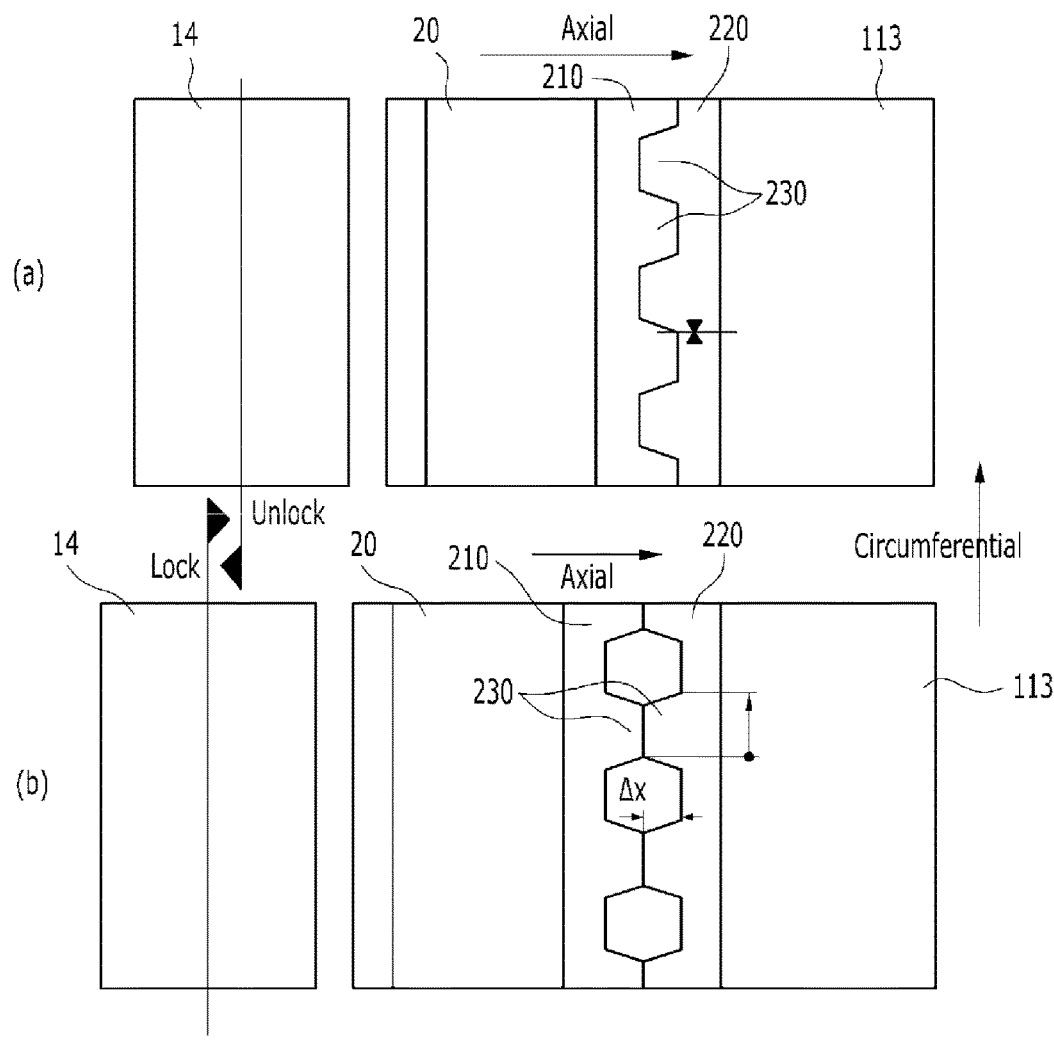

[FIG. 11]
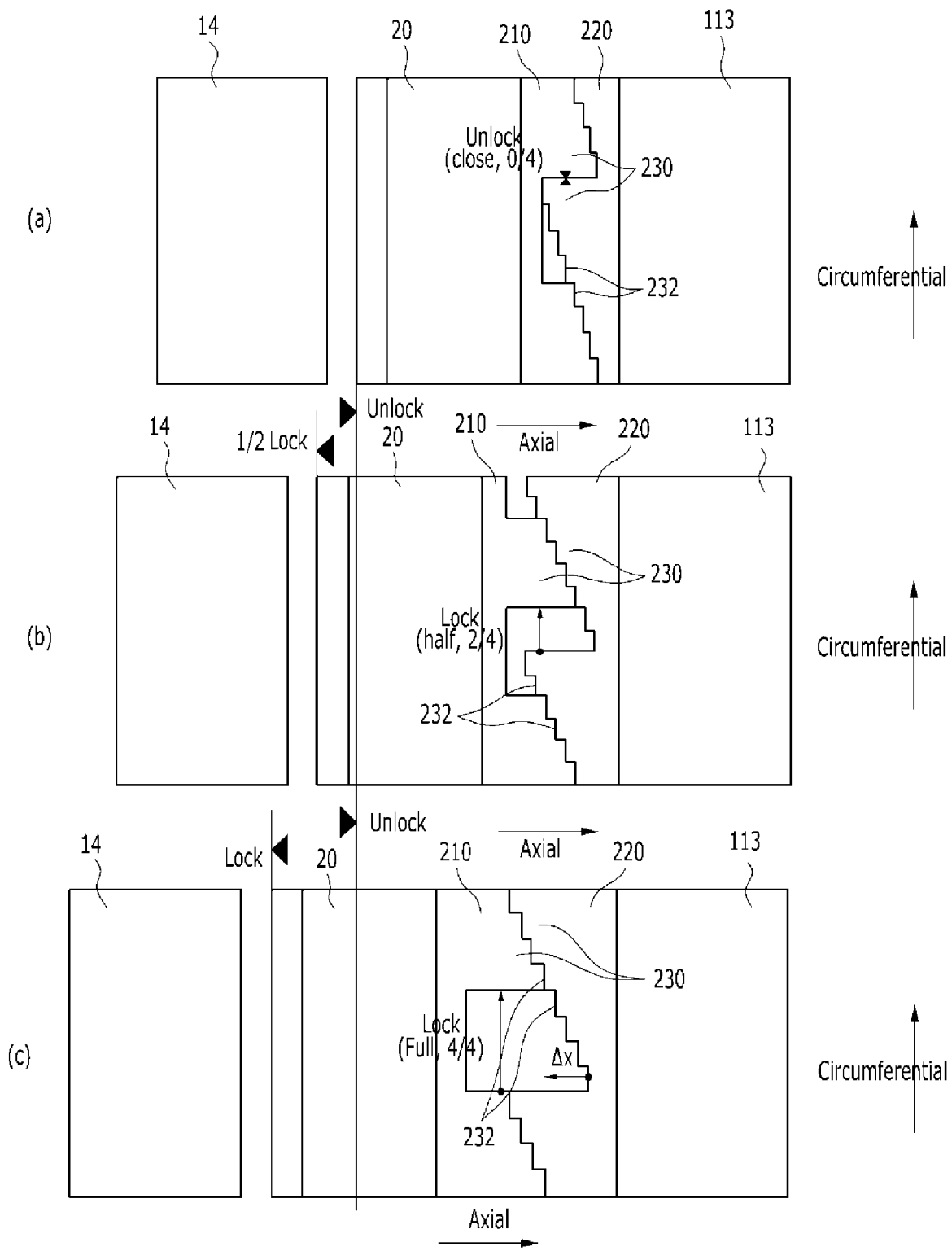

[FIG. 12]
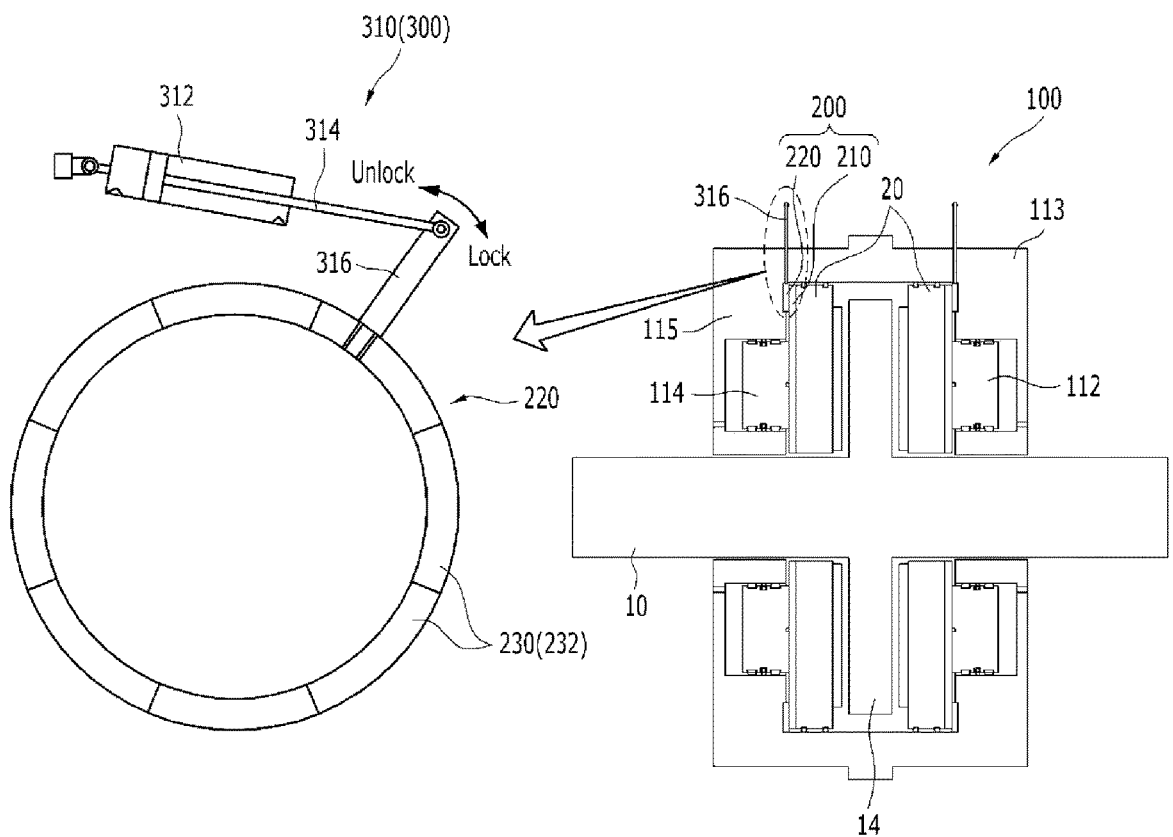

[FIG. 13]
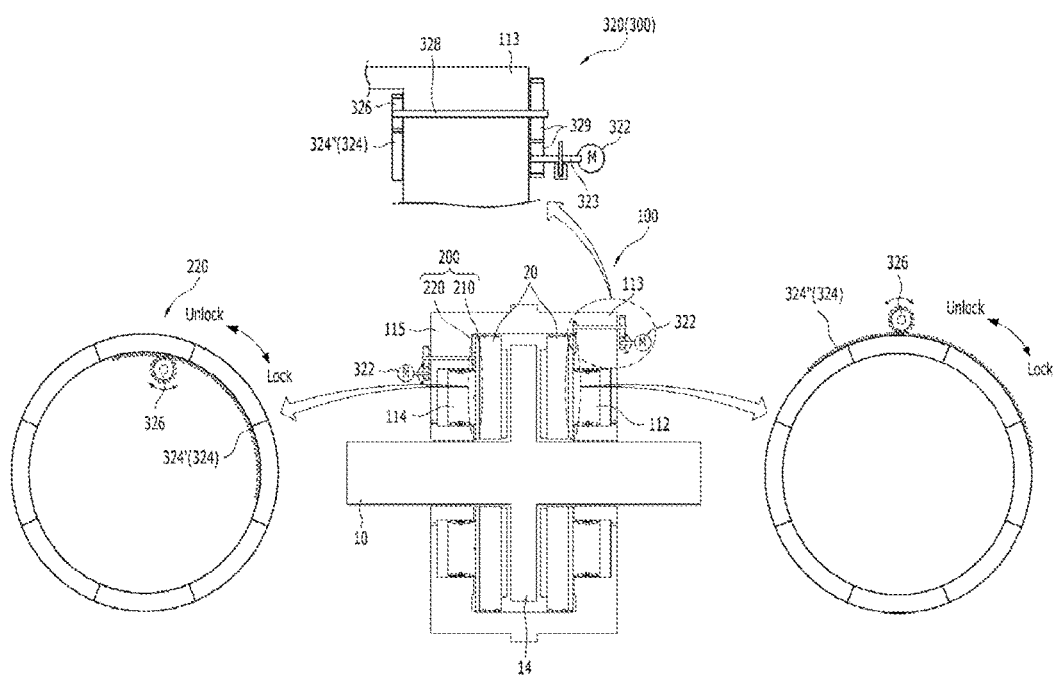

BLADE TIP CLEARANCE CONTROL APPARATUS FOR GAS TURBINE

CROSS REFERENCE TO RELATED APPLICATION

The present application claims priority to Korean Patent Application No. 10-2017-0177080, filed Dec. 21, 2017, the entire contents of which is incorporated herein for all purposes by this reference.

BACKGROUND OF THE DISCLOSURE

1. Field of the Disclosure

The present disclosure relates to a blade tip clearance control apparatus for a gas turbine. More particularly, the present disclosure relates to a gas turbine blade tip clearance control apparatus capable of preventing blade tip clearance control failure.

2. Description of the Background Art

A turbine is a mechanical device that obtains a rotational force from an impulse force or a reaction force caused by the flow of compressible fluid, such as steam or gas. Turbines are categorized according to the type of working fluid (e.g., compressible fluid), such as steam turbines using steam, or gas turbines using combustion gas.

A gas turbine has a heat cycle called a Brayton cycle. The gas turbine includes a compressor, a combustor, and a turbine. The gas turbine operates in a manner that: a compressor takes in air, compresses the air, and sends the compressed air to a combustor; the combustor uses the compressed air to produce high-pressure, high-temperature combustion gas to drive a turbine; and the used combustion gas (e.g., exhaust gas) is discharged to the atmosphere. That is, the operation cycle of the gas turbine includes four processes including compression, heating, expansion, and heat rejection.

The compressor takes in air from the atmosphere and supplies the resulting compressed air to the combustor. Since the air is compressed through an adiabatic process, both the pressure and temperature of the air rise while the air undergoes the compression.

The combustor mixes the compressed air with fuel and burns the air and fuel mixture at a constant pressure to produce combustion gas with high energy. To increase the performance of the turbine, the combustor then heats the combustion gas up to temperatures which can be withstood by the combustor and turbine parts.

In the turbine, the high-pressure, high-temperature combustion gas delivered from the combustor expands and impinges on or glides over the turbine blades, causing rotary movement, or mechanical energy. A portion of the mechanical energy generated by the turbine is harnessed to drive the compressor for air compression, and the remaining portion is harnessed to drive an electric generator for electricity generation.

As described above, the main components of the gas turbine do not perform reciprocating motion. That is, the gas turbine has no mutually frictional parts, such as a piston-cylinder assembly, so it consumes an extremely small amount of lubricating oil, is free of a long operation stroke which is the characteristic of a reciprocating machine and performs a high-speed operation.

Here, the compressor is a rotary machine that takes in air from the atmosphere and compresses the air for combustion and cooling. The compressor includes a rotor shaft that is rotated at high speed and supported by bearings. A plurality of rotor disks is concentrically engaged with the rotor shaft. On the outer circumferential surface of each of the rotor disks, a plurality of blades is radially arranged at intervals along a circumferential direction. Air that is introduced into the compressor is compressed to a higher pressure every time it passes through the compressor rotor disks, one after another, each rotor disk forming one compressor rotor blade stage.

FIG. 1 is a schematic view illustrating a compressor rotor 10 which has an overall cone shape because the diameter of each compressor blade assembly (e.g., each compressor blade stage) increases toward the downstream. The rotor 10 is surrounded by a stator 1 with a fine clearance between the stator 1 and a blade tip 12 of the rotor 10. The size of the clearance is critical to the performance of the compressor.

As it can be seen in FIG. 1, the rotor 10 is moved forward, which is the left side in the figure, or backward, which is the right side in the figure, by a thrust. Since the rotor 10 is of the cone shape, the blade tip clearance alters according to the forward and backward movements. In other words, when the rotor 10 moves forward, the tip clearance decreases. Conversely, when the rotor 10 moves backward, the tip clearance increases.

As described above, since the blade tip clearance is critical to the performance of the compressor, various techniques for controlling the blade tip clearance have been introduced. FIG. 2 schematically illustrates a hydraulic clearance control device 110 serving as a blade tip clearance control apparatus.

In FIG. 2, the operation of the hydraulic clearance control device 110 is briefly described. Each of a pair of thrust bearings 20 surrounding a thrust collar projecting in a radial direction of the rotor 10 is pushed or pulled by a hydraulic device so that a position of the rotor 10 in a horizontal direction is changed. In this way, the clearance of the blade tip 12 can be adjusted. The optimum location of the rotor 10 is determined based on the distance to a thrust collar 14 measured by axial position sensors 116 installed on the respective thrust bearings 20.

This type of hydraulic clearance control device 110 has an advantage of largely improving the compressor performance because it dynamically controls the clearance of the blade tip 12, but there are also risk factors in terms of operation safety.

The direction of thrust acting on the gas turbine is not always constant. In other words, the direction is not always forward or backward. That is, the thrust changes in direction and magnitude according to the design or operating conditions of the gas turbine. Thus, when the hydraulic circuit of the hydraulic clearance control device 110 malfunctions or fails to perform proper clearance control due to long time operation fatigue or abrasion of parts, the performance of the compressor is not only simply deteriorated, but the clearance of the blade tip 12 becomes an extremely small size or even a zero size, resulting in fracturing of the blades.

Therefore, a countermeasure needs to be taken to deal with the malfunctioning of the hydraulic clearance control device 110.

SUMMARY OF THE DISCLOSURE

The present disclosure has been devised in consideration of the problems occurring in the related art and is intended to provide a blade tip clearance control apparatus for a gas turbine, where the apparatus is capable of preventing a failure in controlling a blade tip clearance even in emergency situations, such as failure or malfunctioning of a hydraulic clearance control device due to long time operation fatigue or abrasion of parts, and is capable of increasing the life span of the hydraulic clearance control device by reducing actual operation hours of the hydraulic clearance control device.

The apparatus also enables a normal operation of the hydraulic clearance control device even in emergency situations, such failure or malfunctioning of the hydraulic clearance control device, thereby improving operation stability of the gas turbine.

Further, the apparatus is capable of dynamically and automatically adjusting an operating clearance without any design change or any installation adjustment when it is required to adjust the position of the hydraulic device included in a hydraulic clearance control device, according to changes in installation conditions or operating conditions when it is necessary to adjust the operating clearance in a state in which the hydraulic device is not in operation.

According to the present disclosure, a blade tip clearance control apparatus includes: a rotor including a thrust collar, a pair of thrust bearings for axially supporting the thrust collar, and a plurality of radially extending blades; a hydraulic clearance control device including a first hydraulic cylinder for moving any one of the pair of thrust bearings in a forward axial direction and a second hydraulic cylinder for moving the remaining thrust bearing in a backward axial direction; and a cylinder locking device including a first locking device for restricting a forward moving distance of the first hydraulic cylinder and a second locking device for restricting a reverse moving distance of the second hydraulic cylinder.

In a first embodiment of the present disclosure, the cylinder locking device may be a stopper member functioning to restrict a movement range of the first hydraulic cylinder or the second hydraulic cylinder and may be operated by an actuator functioning to actuate the stopper member forward and backward.

The first locking device may be operated when reverse thrust acts on the rotor shaft.

The second locking device may be operated when forward thrust acts on the rotor shaft.

The blade tip clearance control apparatus may operate in a manner that a hydraulic pressure continues to be applied to the first hydraulic cylinder or the second hydraulic cylinder while the first locking device or the second locking device is in operation.

Alternatively, the blade tip clearance control apparatus may operate in a manner that a hydraulic pressure is applied to the first hydraulic cylinder or the second hydraulic cylinder only for a predetermined period when the first locking device or the second locking device is activated or deactivated.

The second locking device may be operated during a start-up session or a shut-down session of a gas turbine.

The blade tip clearance control apparatus may include a main hydraulic circuit device and an emergency hydraulic circuit device respectively connected in parallel to hydraulic lines connected to the first hydraulic cylinder and the second hydraulic cylinder, respectively.

The emergency hydraulic circuit device may include a second forward control valve for operating the first hydraulic cylinder and a second reverse control valve for operating the second hydraulic cylinder, and the blade tip clearance control apparatus may further include a second hydraulic pump and a third hydraulic pump that are connected in parallel to the second forward control valve and the second reverse control valve, respectively.

In particular, the second hydraulic pump operates on AC power, and the third hydraulic pump operates on DC power.

In this case, a DC power storage device for supplying DC power to operate the third hydraulic pump may be further included, and the DC power storage device may rectify alternating current (AC) power and store direct current (DC) power.

In a second embodiment of the present disclosure, the cylinder locking device including the first and second locking devices may serve as an operating clearance varying device which can change an operating clearance of each of the first and second hydraulic cylinders with respect to the thrust collar.

The operating clearance varying devices may be provided in the first and second hydraulic cylinders, respectively. Each of the operating clearance varying devices may include a stationary plate fixedly mounted on a second surface of the thrust bearing, in which the second surface is a surface not facing the thrust collar, and a sliding ring mounted on another surface of a corresponding one of the first cylinder housing and the second cylinder housing in which the first and second hydraulic cylinders are respectively accommodated. The sliding ring may be mounted to be rotated in a forward circumferential direction and a reverse circumferential direction. With this structure, the operating clearance may be maintained in a manner that gear teeth projecting from a circumference of the stationary plate meet gear teeth projecting from a circumference of the sliding ring.

In the second embodiment, the gear teeth of the stationary plate and the gear teeth of the sliding ring may enter a first contact state (also referred to as a meshed state or a top-to-bottom contact state) in which the top lands of the gear teeth of one party among the stationary plate and the sliding ring are superimposed on the bottom lands of the gear teeth of the other party or a second contact state (also referred to as an unmeshed state or a top-to-top contact state) in which the top lands of the gear teeth of the stationary plate are in contact with the top lands of the gear teeth of the sliding ring.

The gear teeth of the stationary plate and the gear teeth of the sliding ring may have flat tops.

The gear teeth of the stationary plate and the gear teeth of the sliding ring may have a trapezoid shape.

In a third embodiment, the faces of the gear teeth of the stationary plate are inclined in a first direction and the faces of the gear teeth of the sliding ring may be inclined in a second direction which is opposite to the first direction. In addition, the inclined face of each gear tooth may be formed in a multi-tier stair-step shape, and the shape of the inclined face of the gear tooth of the stationary plate corresponds to the shape of the inclined face of the gear tooth of the sliding ring so that the gear teeth of the stationary plate can mesh with the gear teeth of the sliding ring.

Here, an inclination angle of the inclined face of the gear tooth of the stationary plate and an inclination angle of the inclined face of the gear tooth of the sliding ring add up to 90°.

A recess may be provided in the bottom land of each of the gear teeth of either the stationary plate or the sliding ring.

In the third embodiment, the operating clearance varying device adjusts the operating clearance by performing a series of control process of: briefly operating the first hydraulic cylinder or the second hydraulic cylinder to cancel a pressing force applied to the sliding ring by the stationary plate;

rotating the sliding ring by a predetermined angle to switch the gear teeth of the stationary plate and the gear teeth of the sliding ring from the first contact state to the second contact state or reversely; and returning the first hydraulic cylinder or the second hydraulic cylinder to an original position.

The sliding ring may be configured to rotate about a fixed point on an outer surface of a corresponding one of the first cylinder housing and the second cylinder housing.

The operating clearance varying device may include a ring drive mechanism for rotating the sliding ring, and the ring drive mechanism may be a hydraulic ring drive mechanism including a ring-driving hydraulic cylinder which exerts a force on the sliding ring in an arbitrary direction which does not pass through a rotation center of the sliding ring.

The ring-driving hydraulic cylinder may be mounted to be rotatable about a fixture existing around the rotor in which the fixture includes the first cylinder housing or the second cylinder housing, and a free end of a retractable cylinder rod of the ring-driving hydraulic cylinder may be pivotably coupled with a radially projecting arm handle fixed to the sliding ring.

The hydraulic ring drive mechanism can adjust a rotation angle of the sliding ring by controlling the distance of advancing motion and the distance of retreating motion of the cylinder rod.

Alternatively, the ring drive mechanism included in the blade tip clearance control apparatus according to the present disclosure may be constructed of an electric ring drive mechanism including an electric motor provided with a pinion gear that rotates a ring gear formed along a circumference of the sliding ring.

In this case, the ring gear and the pinion gear may mesh with each other in an inscribed manner or a circumscribed manner.

The electric motors may be fixedly mounted on the outer surfaces of the first cylinder housing and the second cylinder housing, respectively, and a rotary shaft of each of the electric motors may rotate a shaft that is installed to extend through a corresponding one of the first cylinder housing and the second cylinder housing, thereby rotating the pinion gear.

The rotary shaft of the electric motor and the shaft may be coupled by a pair of spur gears.

In this case, a gear ratio which is a ratio of the number of teeth of one spur gear of the two spur gears with respect to the number of teeth of the other spur gear may corresponds to a shaft speed reduction rate.

The blade tip clearance control apparatus according to the present disclosure, which is structured as described above, includes the cylinder locking device that restricts the forward moving distance and the reverse moving distance of the hydraulic clearance control device. Therefore, the blade tip clearance control apparatus has an advantage of not failing in blade tip clearance control although errors or failure occurs in the hydraulic clearance control device.

Since the blade tip clearance control apparatus according to the present disclosure is constructed of mechanical devices, the blade tip clearance control apparatus constantly stably operates if serious failure or fracturing does not occur. Therefore, the safety of the blade tip clearance control apparatus can be more reliably guaranteed.

In addition, since the blade tip clearance control apparatus is operated in a manner that a hydraulic pressure is applied to the hydraulic clearance control device only for a predetermined period of time when the cylinder locking device is activated or deactivated, it is possible to reduce actual operation hours of the hydraulic clearance control device, resulting in an increase in the life span of the hydraulic clearance control device.

Further, since the blade tip clearance control apparatus according to the present disclosure includes an emergency hydraulic circuit device that operates independently of a main hydraulic circuit device, even though an emergency such as failure or errors occurs in the hydraulic clearance control device, a normal operation of the hydraulic clearance control device can be reliably ensured. For this reason, the operational stability of the blade tip clearance control apparatus can be greatly improved.

In addition, according to the present disclosure, the blade tip clearance control apparatus may include the operating clearance varying device serving as the cylinder locking device. For this reason, when it is necessary to adjust the position of the hydraulic mechanism included in the hydraulic clearance control device, according to changes in installation conditions or operating conditions, that is, the operating clearance in a state in which the hydraulic mechanism is not in operation, it is possible to automatically and dynamically adjust the operating clearance without any design changes or installation adjustments.

BRIEF DESCRIPTION OF THE DRAWINGS

FIG. 1 is a schematic view illustrating a compressor rotor of a cone shape;

FIG. 2 is a view illustrating the configuration of a conventional hydraulic clearance control device;

FIG. 3 is a view illustrating the internal structure of a gas turbine to which a blade tip clearance control apparatus according to the present disclosure is applicable;

FIG. 4 is a detailed view illustrating a compressor for the gas turbine of FIG. 3;

FIG. 5 is a view illustrating a blade tip clearance control apparatus according to the present disclosure;

FIG. 6 is a view illustrating one embodiment of a method of driving the blade tip clearance control apparatus in FIG. 5;

FIG. 7 is a view illustrating another embodiment of a method of driving the blade tip clearance control apparatus in FIG. 5;

FIG. 8 is a view illustrating an emergency hydraulic circuit device that can be additionally provided in the blade tip clearance control apparatus according to the present disclosure;

FIG. 9 is a view illustrating an operating clearance varying device that can be included in the blade tip clearance control apparatus according to the present disclosure;

FIG. 10 is a view illustrating one embodiment of the operating clearance varying device;

FIG. 11 is a view illustrating another embodiment of the operating clearance varying device;

FIG. 12 is a view illustrating one embodiment of a hydraulic ring drive mechanism utilizing a hydraulic cylinder; and FIG. 13 is a view illustrating another embodiment of an electric ring drive mechanism utilizing an electric motor.

DETAILED DESCRIPTION OF THE DISCLOSURE

Herein below, the present preferred embodiments of the present disclosure will be described in detail with reference to the accompanying drawings. Reference should be made to the drawings, in which the same reference signs or numerals are used throughout the drawings to designate the same or similar components. Further, in describing exemplary embodiments of the present disclosure, well-known functions or constructions will not be described in detail since they may unnecessarily obscure the understanding of the present disclosure.

Terms, such as first, second, A, B, (a), (b), etc. may be used herein to describe elements of the present disclosure. Each of these terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 3 is a view illustrating the internal structure of a gas turbine to which a blade tip clearance control apparatus according to the present disclosure is applicable, and FIG. 4 is a detailed view of a compressor of the gas turbine of FIG. 3.

As illustrated in FIGS. 3 and 4, a gas turbine 1000 to which the blade tip clearance control apparatus according to the present disclosure is applicable includes a compressor 1100, a combustor 1200, and a turbine 1300. The compressor 1100 takes in air and compresses the air. The combustor 1200 mixes fuel with the compressed air produced by the compressor 1100 and burns the fuel and air mixture to generate combustion gas. The turbine 1300 is rotated by the combustion gas delivered from the combustor 1200.

The compressor 1100 includes a compressor rotor disk 1110, a center tie rod 1120, a plurality of compressor blades 1130, a stator 1140, and a compressor housing 1150.

The compressor rotor disk 1110 retains the compressor blades 1130 and rotates in conjunction with the center tie rod 1120, thereby rotating the compressor blades 1130. The compressor 1100 may include a plurality of compressor rotor disks 1110.

The plurality of compressor rotor disks 1110 is fastened by the center tie rod 1120 so as not to be axially separated from each other. Each of the compressor rotor disks 1110 is penetrated by the center tie rod 1120 and arranged in the axial direction of the compressor rotor. Each of the compressor rotor disks 1110 has projections (not illustrated) provided on the outer periphery thereof, and a flange 1111 is combined with a corresponding compressor rotor disk 1110 so that the compressor rotor disks 1110 can rotate together with the adjacent compressor rotor disks 1110.

Among the plurality of compressor rotor disks 1110, at least one compressor rotor disk 1110 is provided with a compressed air supply passage. The compressed air delivered from the compressor blades 1130 flows toward the turbine 1300 through the compressed air supply passage, thereby cooling turbine blades.

The center tie rod 1120 is installed to pass through the compressor rotor disks 1110 to maintain the compressor rotor disks 1110 arranged in place. The center tie rod 1120 receives a torque transmitted from the turbine 1300 and rotates the compressor rotor disks 1110 with the torque. To this end, a torque tube 1400 may be disposed between the compressor 1100 and the turbine 1300. The torque tube 1400 is a torque transfer member for transferring the torque generated by the turbine 1300 to the compressor 1100.

An end (hereinafter, referred to as a first end) of the center tie rod 1120 is engaged with an inner side portion of the most upstream side compressor rotor disk and the other end (hereinafter, referred to as a second end) is inserted into the torque tube 1400. The second end of the center tie rod 1120 is engaged with a pressure nut 1121 within the torque tube 1400. The pressure nut 1121 presses the torque tube 1400 against the compressor rotor disks 1110 to reduce spacing between the compressor rotor disks 1110 so that the compressor rotor disks 1110 can be compactly fastened.

The compressor blades 1130 are radially retained by the outer circumferential surface of the compressor rotor disk 1110. As to the compressor blades 1130, more than one compressor blades 1130 may be retained by each compressor rotor disk which forms one compressor rotor stage, so that there are multiple compressor rotor stages each with the plurality of compressor blades 1130. Each of the compressor blades 1130 has a dove tail-shaped root member to be retained by the compressor rotor disk 1110. In this embodiment, although the compressor blades 1130 are retained by the compressor rotor disk 1110 in a dove-tail fastening manner, the fastening method is not limited thereto. That is, the compressor blades 1130 can be retained by the compressor rotor disk 1110 in other ways. The compressor blades 1130 rotate along the rotation of a corresponding one of the compressor rotor disks 1110, thereby compressing the introduced air and sending the compressed air to a stator 1140 disposed at the next stage.

The stator 1140 guides the compressed air delivered from the preceding compressor rotor stage composed of the compressor blades 1130 toward the next compressor rotor stage composed of the compressor blades 1130.

The compressor housing 1150 forms an exterior form or appearance of the compressor 1100. The compressor housing 1150 accommodates the compressor rotor disks 1110, the center tie rod 1120, the compressor blades 1130, the stators 1140, etc.

The compressor housing 1150 may be provided with a connection pipe through which the air increasingly compressed through multiple stages of the compressor blades 1130 is delivered toward the turbine 1300 to cool the turbine blades.

At the outlet of the compressor 1100, a diffuser for diffusing the compressed air is disposed. The diffuser rectifies the compressed air before the compressed air enters the combustor and converts a portion of the kinetic energy of the compressed air into a static pressure.

FIGS. 3 and 4 illustrate the overall general configuration of the gas turbine 1000 to which the blade tip clearance control apparatus 100 according to the present disclosure is applicable. As illustrated in the figure, the gas turbine 1000 includes the blade tip clearance control apparatus 100 according to the present disclosure for the purpose of tip clearance control of the compressor blades 1130 arranged in multiple stages having an overall conical shape.

FIG. 5 is a view illustrating the blade tip clearance control apparatus 100 according to the present disclosure. The present disclosure will be described below in detail with reference to FIG. 5. The following description will be focused on the blade tip clearance control apparatus 100 according to the present disclosure, and the structure of the gas turbine 1000 can be understood by referring to FIGS. 3 and 4.

The blade tip clearance control apparatus 100 according to the present disclosure is applicable to the rotor 10 provided in a compressor of a gas turbine. The blade tip clearance control apparatus 100 is roughly divided into the hydraulic clearance control device 110 and a cylinder locking device 120.

The rotor 10 and the thrust bearings 20 mounted on the rotor 10 will be described first. The rotor 10 is provided with the thrust collar 14, and the thrust collar 14 is axially supported by the pair of thrust bearings 20.

The rotor 10 includes a plurality of rotor disks, and each rotor disk is provided with a plurality of blades arranged at intervals in a circumferential direction and retained by the outer circumferential surface of the rotor disk. Accordingly, the rotor 10 includes a plurality of blades each extending in a radial direction thereof. The air introduced into the compressor is increasingly compressed stepwise to higher pressure every time it passes through each blade stage, where each stage is formed by a rotor disk and a plurality of blades.

In the rotor 10, the diameter of each of the multiple blade stages increases toward the downstream. Thus, the rotor 10 has an overall conical shape, and such a configuration is illustrated in FIGS. 1 and 4. As described above, the tip clearance of the blade surrounded by the stator is altered when the rotor 10 is moved forward (for example, toward the left side in the figure) or backward (or in the reverse direction, for example, toward the right side in the figure) by thrust. In other words, when the rotor 10 moves forward, the tip clearance decreases. Conversely, when the rotor 10 moves backward, the tip clearance increases.

The blade tip clearance can be controlled using this characteristic, and a device used for this purpose is the hydraulic clearance control device 110. The hydraulic clearance control device 110 includes the first hydraulic cylinder 112 for moving one of the pair of thrust bearings 20 in a forward axial direction and the second hydraulic cylinder 114 for moving the other thrust bearing 20 in the reverse direction (e.g., a backward axial direction).

When the first hydraulic cylinder 112 is in operation, a pressure plate provided at the front end of the first hydraulic cylinder 112 advances, thereby pushing the thrust bearing 20 abutting thereon toward the left side of FIG. 5, and accordingly the thrust collar 14 supported by the thrust bearings 20 is pushed leftward, so that the rotor 10 moves forward. Accordingly, when the first hydraulic cylinder 112 is operated, the tip clearance decreases.

The operational effect of the second hydraulic cylinder 114 positioned to face the first hydraulic cylinder 112 is opposite to that of the first hydraulic cylinder 112. When the second hydraulic cylinder 114 is operated, the blade tip clearance increases.

The first hydraulic cylinder 112 is in operation when a leftward thrust acts on the rotor 10. That is, the first hydraulic cylinder 112 operates to adjust the blade tip clearance or to prevent the blade tip clearance from increasing because the blade tip clearance tends to increase when the backward thrust or reverse thrust for moving the rotor 10 is generated. The second hydraulic cylinder 114 is operated in the opposite conditions to the first hydraulic cylinder 112.

As described above, the hydraulic clearance control device 110 can control the blade tip clearance which is increased or decreased by the thrust which acts on the rotor 10 in either the forward direction or the backward (reverse) direction. The first hydraulic cylinder 112 and the second hydraulic cylinder 114 are provided in pair and are arranged to face each other as the thrust does not act on the rotor 10 constantly in any one direction and the magnitude of the thrust is not constant. The magnitude of the thrust may vary depending on the acting direction of the thrust and the design and operating conditions.

When the hydraulic circuit of the hydraulic clearance control device 110 malfunctions or fails to perform a proper clearance control due to a prolonged operation fatigue or abrasion of parts, the performance of the compressor is not only deteriorated, but the clearance of the blade tip 12 is likely to decrease to an extremely small size or even to a zero size, resulting in fracturing of the blades.

Therefore, a countermeasure for ensuring safe operation of the hydraulic clearance control device 110 may be needed. To this end, the blade tip clearance control apparatus according to the present disclosure includes a cylinder locking device 120 where the cylinder locking device 120 includes a first locking device 122 for restricting a forward moving distance of the first hydraulic cylinder 112 and a second locking device 124 for restricting a reverse moving distance of the second hydraulic cylinder 114.

Here, the restricting the forward moving distance of the first hydraulic cylinder 112 means the operation of preventing the first hydraulic cylinder 112 from being displaced from a fixed position in the reverse direction. Accordingly, when the first locking device 122 is in operation, the blade tip clearance corresponding to the forward moving distance which is fixed is secured and does not get increased any longer.

The second locking device 124 operates in the same manner as the first locking device 122 except that the second locking device 124 restricts the reverse moving distance of the second hydraulic cylinder 114. Accordingly, when the second locking device 124 is in operation, the blade tip clearance corresponding to the reverse moving distance which is fixed is secured and does not get increased any longer.

The first locking device 122 is activated when the reverse thrust is applied to the rotor 10, thereby restricting the forward moving distance of the first hydraulic cylinder 112, and the second locking device 124 is activated when the forward thrust is applied to the rotor 10, thereby restricting the reverse moving distance of the second hydraulic cylinder 114.

Desirably, each of the first and second locking devices 122 and 124 may be constructed of a mechanical device which is likely to operate in a reliable manner. That is, such a reliable mechanical device may be more suitable for ensuring the safety of equipment than an electronic device, such as a proportional-integral-derivative (PID) hydraulic controller which operates based on the distance measured by the axial position sensor 116.

In the embodiment of the present disclosure, the cylinder locking device 120 is constructed of a stopper member 130 that can restrict the movement of the first and second hydraulic cylinders 112 and 114 and is operated by an actuator that moves the stopper member 130 forward and backward. A hydraulic actuator may be suitably used as the actuator 132 where the actuator 132 functions to restrict the movement of the hydraulic cylinders 112 and 114. When using such a hydraulic actuator, an additional hydraulic circuit independent of a hydraulic circuit of the hydraulic clearance control device 110 may be used in terms of securing the safety.

FIG. 6 is a view illustrating one embodiment of a method of driving the blade tip clearance control apparatus of FIG. 5. Referring to FIG. 5, a timing chart collectively illustrates operations of the first and second hydraulic cylinders 112 and 114 and their associated first and second locking devices 122 and 124 to explicitly show their operation relationships.

The reference signs Sfwd, Pfwd, Srev, and Prev denote the operations of the first locking device 122, the first hydraulic cylinder 112, the second locking device 124, and the second hydraulic cylinder 114, respectively. In addition, the acronyms GT, FSNL, and HCO stand for a gas turbine, full speed no load, and a hydraulic clearance optimizer, respectively.

During the period in which the hydraulic clearance control device 110 is in operation (e.g., during the interval from HCO-On to HCO-Off), the first and second hydraulic cylinders 112 and 114 and their associated first and second locking devices 122 and 124 are in operation according to the direction of the thrust acting on the rotor 10. The timing chart shows that the first hydraulic cylinder 112 and the first locking device 122 operate once.

Referring to FIG. 6, the blade tip clearance control apparatus 100 operates in such a manner that a hydraulic pressure is continuously applied to the first hydraulic cylinder 112 or the second hydraulic cylinder 114 during the period in which the first locking device 122 or the second locking device 124 is in the middle of operation. That is, the first locking device 122 and the second locking device 124 function as a sort of auxiliary safety device to assist the first hydraulic cylinder 112 and the second hydraulic cylinder 114.

Alternatively, referring to FIG. 7, the blade tip clearance control apparatus 100 operates in a manner that a hydraulic pressure is applied to the first hydraulic cylinder 112 or the second hydraulic cylinder 114 only for a predetermined time when the first locking device 122 or the second locking device 124 is activated or deactivated. That is, according to the embodiment of FIG. 7, the first locking device 122 and the second locking device 124 directly fix or restrict the blade tip clearance after restricting the movements of the first hydraulic cylinder 112 and the second hydraulic cylinder 114. The embodiment of FIG. 7 has an advantage of increasing the life span of the hydraulic clearance control device 110 by reducing actual operation hours of the hydraulic clearance control device 110.

In addition, the embodiments of FIGS. 6 and 7 are common in that the second locking device 124 continuously operates (refer to "Srev") during the period in which the gas turbine performs a start-up session or a shut-down session. This has an advantage of preventing damages to the blades such as fracturing of the blades by maintaining the optimum blade tip clearance especially when the vibration is significantly large, for example, when the gas turbine is started up or shut down.

FIG. 8 is a view illustrating an emergency hydraulic circuit device 150 that can be additionally provided in the blade tip clearance control apparatus 100 according to the present disclosure, aside from a main hydraulic circuit device 140. As compared to the emergency hydraulic circuit device 150, the main hydraulic circuit device 140 is a hydraulic operation circuit basically provided in the blade tip clearance control apparatus 100. The main hydraulic circuit device 140 is used in a normal state or a steady state. On the other hand, the emergency hydraulic circuit device 150 is an auxiliary safety means for enabling the blade tip clearance control apparatus 100 to normally operate under emergency conditions, for example, when an error or failure occurs in the main hydraulic circuit 140, that is, at the time of malfunctioning of the main hydraulic circuit 140.

The main hydraulic circuit device 140 and the emergency hydraulic circuit device 150 are collectively controlled by a controller. Thus, when the controller detects an abnormal state during operation of the main hydraulic circuit device 140, that is, a state in which the hydraulic pressure drops below a predetermined reference level and does not recover or a state in which the axial position sensor 116 cannot detect the operations of the first hydraulic cylinder 112 and the second hydraulic cylinder 114, the controller performs the control of operating the emergency hydraulic circuit device 150 instead of the main hydraulic circuit device 140.

The main hydraulic circuit device 140 and the emergency hydraulic circuit device 150 are respectively connected in parallel to hydraulic lines respectively connected to the first hydraulic cylinder 112 and the second hydraulic cylinder 114. Therefore, the main hydraulic circuit device 140 and the emergency hydraulic circuit device 150 can operate independently of each other. The main hydraulic circuit device 140 is provided with a first forward control valve 142 and a first reverse control valve 144, and the emergency hydraulic circuit device 150 is provided with a second forward control valve 152 and a second reverse control valve 154. In addition, the main hydraulic circuit device 140 and the emergency hydraulic circuit device 150 are respectively provided with a first hydraulic pump 146 and a second hydraulic pump 156 which operate on AC power. That is, the main hydraulic circuit device 140 and the emergency hydraulic circuit device 150 are basically similar to each other in terms of constituent elements thereof. The main hydraulic circuit device 140 and the emergency hydraulic circuit device 150 are similar as the forward control valves 142 and 152 for operating the first hydraulic cylinder 112, the reverse control valves 144 and 154 for operating the second hydraulic cylinder 114, and the hydraulic pumps 146 and 156 are essential elements for operation of the blade tip clearance control apparatus 100.

However, unlike the main hydraulic circuit device 140, the emergency hydraulic circuit device 150 includes one more hydraulic pump for securing equipment safety in an emergency. The additional hydraulic pump is a third hydraulic pump 158 operating on DC power. The third hydraulic pump 158 is an important component for preventing control failure of the blade tip clearance control apparatus 100 even when the AC power is cut off. The third hydraulic pump 158 is connected in parallel with the second hydraulic pump 156 and is connected in series with the second forward control valve 152 and the second reverse control valve 154. Thus, when the AC power supply is interrupted and the second hydraulic pump 156 is inoperable, the third hydraulic pump 158 starts operating instead of the second hydraulic pump 156. The emergency hydraulic circuit device 150 includes a DC power storage device 159 for supplying power to operate the third hydraulic pump 158. The DC power source storage device 159 rectifies the alternating current (AC) during the supply of the AC power and stores the direct current (DC). The controller monitors the charged state of the DC power source storage device 159 and manages the amount of DC power stored in the storage device not to drop below a predetermined level.

FIGS. 9 through 11 illustrate the blade tip clearance control apparatus 100 according to a second embodiment of the present disclosure. The second embodiment relates to an operating clearance varying device 200 that adjusts the position of the hydraulic clearance control device 110 included in the blade tip clearance control apparatus 100. That is, the operating clearance varying device 200 is a device capable of adjusting the clearance (hereinafter, referred to as "operating clearance") of each of the first hydraulic cylinder 112 and the second hydraulic cylinder 114 with respect to the thrust collar 14.

It is often necessary to adjust the operating clearance of the hydraulic clearance control device 110 in accordance with changes in the installation conditions of the blade tip clearance control apparatus 100 and in the operating conditions of the gas turbine. In order for the blade tip clearance control apparatus 100 of the present disclosure to operate properly, the operating clearance and the strokes of the first and second hydraulic cylinders 112 and 114 must be controlled to be within the designed ranges. The dimensions of the blade tip clearance control apparatus 100 are directly affected by a minute design change in the rotor 10 or its peripherals, and the operational positions of the first and second hydraulic cylinders 112 and 114 are predetermined. Therefore, the installation of the blade tip clearance control apparatus 100 needs to be adjusted with the design change. Further, there is a variation in dynamic characteristics among gas turbines, depending on their operating conditions. Therefore, when a gas turbine is installed in the field for actual operation, the operating clearance needs to be adjusted according to the operating conditions.

According to the second embodiment illustrated in FIGS. 9 through 11, the blade tip clearance control apparatus 100 has an advantage of easing of adjustment of installation arrangements and even making an automatic clearance adjustment possible.

FIG. 9 illustrates the overall construction of the operating clearance varying device 200 included in the blade tip clearance control apparatus 100. Referring to FIG. 9, the first hydraulic cylinder 112 and the second hydraulic cylinder 114 include respective operating clearance varying devices 200. This is because it is necessary to adjust the operating clearance both in the forward direction and the reverse direction. Since the pair of operating clearance varying devices 200 are mirror-symmetrical with respect to the thrust collar 14, only one operating clearance varying device 200 provided in the first hydraulic cylinder 112, between the pair of operating clearance varying devices 200, will be described.

The operating clearance varying device 200 is disposed in a space between the thrust bearing 20 and the first hydraulic cylinder 112. In other words, the operating clearance varying device 200 is disposed on a second surface of the thrust collar 14, which is opposite to a first surface facing the thrust collar 14, where the first surface and the second surface, also called one surface and the other surface respectively, are termed with reference to a direction of the thrust collar. The distance, which is also referred to as a working distance, between the first hydraulic cylinder 112 and the thrust collar 14 can be adjusted by the operating clearance varying device 200, in which the thrust collar 14 receives the hydraulic pressure which is a force of moving the rotor 10 forward from the first hydraulic cylinder 112.

The operating clearance varying device 200 includes a stationary plate 210 fixedly mounted on the second surface of the thrust bearing 20 and a sliding ring 220 fitted on the outer surface of the first cylinder housing 113 in which the first hydraulic cylinder 112 is accommodated. The sliding ring 220 is mounted in a manner of being rotatable along the outer circumferential surface of the first cylinder housing 113 in a forward circumferential direction and a reverse circumferential direction by a certain angle within a predetermined angle range. The stationary plate 210 and the sliding ring 220 are constantly in contact with each other except for a period in which the stationary plate 210 and the sliding ring 220 are switched from the first contact state to the second contact state or switched reversely. The first hydraulic cylinder 112 applies a hydraulic pressure to the stationary plate 210, thereby moving the thrust bearing 20 relative to the thrust collar 14.

The stationary plate 210 is usually formed in the form of a flat plate to receive the hydraulic pressure applied by the first hydraulic cylinder 112. However, as long as the stationary plate 210 can receive the force applied by the first hydraulic cylinder 112, it may take any form, for example, the form of a ring having an opening at the center. Thus, the term plate in the stationary plate 210 should not be construed as defining the shape of the stationary plate 210. On the other hand, the sliding ring 220 is required to have an opening so that the first hydraulic cylinder 112 can pass through when moving forward and backward. Therefore, the sliding ring 220 is provided with an opening at the center. Although the sliding ring 220 needs to have an annular shape, it does not necessarily have to be a closed loop shape. The details of the form of the sliding ring 220 can be understood from the following detailed description of the operating clearance varying device 200.

In the operating clearance varying device 200 according the present disclosure, the stationary plate 210 and the sliding ring 220 are constantly in contact with each other, and the contact surface thereof may not be a flat surface but be a corrugated surface in which mountains and valleys are alternate with each other like the form of the gear teeth 230. The contact surface with the gear tooth 230 is illustrated in FIG. 10. FIG. 10 is a plan view illustrating a portion of the gear-meshed junction of the stationary plate 210 and the sliding ring 220, in which the gear teeth 230 formed along the circumference of the stationary plate 210 and the gear teeth 230 formed along the circumference of the sliding ring 220 are meshed.

The gear teeth 230 are formed to project from the circumference of the stationary plate 210 and the sliding ring 220, and the gear teeth 230 of the stationary plate 210 and the gear teeth 230 of the sliding ring are positioned to face each other. The stationary plate 210 and the sliding ring 220 switch between a first contact state (also referred to as a meshed state or a top-to-bottom contact state, see FIG. 10A) in which the top lands of the gear teeth of one party between the stationary plate 210 and the sliding ring 220 are superimposed on the bottom lands of the gear teeth of the other party and a second contact state (also referred to as an unmeshed state or a top-to-top contact state, see FIG. 10B) in which the top lands of the gear teeth of one party are in contact with the top lands of the gear teeth of the other party. The switching between the first contact state and the second contact state is obtained by rotating the sliding ring 220 which is configured to rotate in the forward circumferential direction and the reverse circumferential direction by an angle within a predetermined angle range.

Comparing the first contact state of FIG. 10A and the second contact state of FIG. 10B, the operating clearance with respect to the thrust collar 14 is reduced by a distance corresponding to the whole depth of the gear teeth 230 in the case of the second contact state of FIG. 10B. That is, by rotating the sliding ring 220 forward or in the reverse direction, the operating clearance can be increased or decreased by a size corresponding to the whole depth of the gear teeth 230.

In this case, the sliding ring 220 is preferably rotated by an angle corresponding to the half of a circular pitch of the gear teeth 230. That is, the sliding ring 220 is rotated until the top land of each gear tooth of the stationary plate perfectly overlaps the top land of each gear tooth of the sliding ring. Alternatively, the same operating clearance can be obtained even in a case where the top land of each gear tooth of the stationary plate 210 partially overlaps the top land of each gear tooth of the sliding ring 220. However, in terms of reliably maintaining the adjusted operating clearance, it is preferable that the top land of each gear tooth of the stationary plate 210 completely overlaps the top land of each gear tooth of the sliding ring 220. That is, preferably, the contact surface area between the stationary plate 210 and the sliding ring 220 is as large as possible.

The rotation angle corresponding to the half of the circular pitch of the gear teeth 230 is the minimum requisite. Since the gear teeth 230 are formed to have a pattern in which identical shapes are repeatedly arranged, an operation that the sliding ring 220 is rotated forward or in the reverse direction by a larger angle than that or is rotated continuously in one direction does not pose a problem. Therefore, in a broader sense, the forward and reverse rotation of the sliding ring 220 should be construed as an operation of changing the positions of the top lands and/or the bottom lands of the gear teeth 230 of the sliding ring 220 so that the top lands of the gear teeth 230 of the sliding ring 220 are positioned to overlap the top lands or the bottom lands of the gear teeth 230 of the stationary plate.

Given the technical features of the operating clearance varying device 200 according to the present disclosure, the operating clearance varying device 200 can be referred to as a mechanical stepper. Although both the hydraulic pressure and the electric power can be used for rotation of the sliding ring 220, the operating clearance varying device 200 can be properly referred to as a mechanical stepper since the operating clearance is adjusted by positioning the gear teeth 230 so as to be meshed or unmeshed. Such a mechanical structure has an advantage of good operation reliability because it constantly stably operates by its nature if there is no abrasion of parts attributable to repetitive operations.

The gear teeth 230 may have a rectangular cross-sectional shape, or a trapezoidal cross-sectional shape as illustrated in FIG. 10. The similarity between the rectangular teeth and the trapezoidal teeth is that the top lands of the teeth are flat. The flat top lands of the gear teeth are advantageous in that a state in which the top lands of gear teeth of one party being in contact with the top lands of gear teeth of the counter party can be easily maintained compared to sharp tops of gear teeth. The trapezoidal gear tooth is somewhat disadvantageous in that the area of the top land of the gear tooth is relatively narrow compared to the rectangular gear tooth. However, the trapezoidal gear tooth is advantageous over the rectangular gear tooth in that switching from a top-to-bottom contact state to a top-to-top contact state or the reverse switching can be smoothly performed through the rotation of the sliding ring 220.

In order to rotate the sliding ring 220, the first hydraulic cylinder 112 is briefly operated so that the pressing force applied to the sliding ring 220 by the stationary plate 210 can be removed because the stationary plate 210 and the sliding ring 220 are in tight pressure contact with each other due to the hydraulic pressure. From the point of view of control, a series of control processes need to be performed: the first hydraulic cylinder 112 is briefly operated to cancel the pressing force applied to the sliding ring 220 by the stationary plate 210; subsequently, the sliding ring 220 is rotated by a predetermined angle to switch the contact state of the gear teeth of the stationary plate and the gear teeth of the sliding ring, and finally the first hydraulic cylinder 112 is returned to the original position where the operation of the first hydraulic cylinder 112 is stopped.

FIG. 11 is a view illustrating another embodiment of the operating clearance varying device 200. The fundamental operation principle and structure of the operating clearance varying device according to the present embodiment are the same as those of the embodiment of FIG. 10, but the present embodiment features each gear tooth 230 having a multi-tire stair-step shape so that the operating clearance can be adjusted in three or more levels.

As described above, the embodiment of FIG. 10 is a two-level variable structure capable of varying the operating clearance by a distance corresponding to the whole depth of the gear teeth 230. However, in some cases it may be desirable or necessary to increase the number of possible adjustment levels for the operating clearance by designing the gear teeth such that the operating clearance can be adjusted in three or more levels. The embodiment illustrated in FIG. 11 relates to a multi-level adjustment of the operating clearance.

The embodiment of FIG. 11 also involves the structure and principle of altering the operating clearance through the rotation control of the sliding ring 220 like the previous embodiment, but this embodiment differs in terms of the form of the gear teeth 230. In the embodiment of FIG. 11, each gear tooth 230 has an inclined face, the faces of all the gear teeth 230 are inclined in one direction, and each inclined face has a multi-tire stair-step shape. Since the stationary plate 210 and the sliding ring 220 are positioned to face each other, the faces of the gear teeth 230 of the stationary plate 210 are inclined in the reverse direction to the inclined faces of the gear teeth 230 of the sliding ring 220. In addition, preferably, an inclination angle of the inclined face of the gear tooth of the stationary plate 210 and an inclination angle of the inclined face of the gear tooth of the sliding ring 220 add up to 90° so that the opposing inclined faces of multi-tier stair-step-shaped faces can be well engaged with each other. Typically, the inclination angle may be 45° for good balance and distribution of the force.

That is, the number of adjustment levels of the operating clearance is determined depending on the number of tiers of the inclined face 232 of each gear tooth. When the stair-step-shaped face of each gear tooth is composed of three or more tiers, the number of possible adjustment levels of the operating clearance can be increased compared to the two-level operating clearance varying device 200 illustrated in FIG. 10. In addition, the whole depth of the gear teeth may be finely segmented further so that the operating clearance can be finely adjusted by a smaller interval.

In addition, according to the embodiment illustrated in FIG. 11, the stair-step-shaped face 232 of each gear tooth 230 may be partially cut away so that an empty space may be presented between the gear teeth of the stationary plate and the gear teeth of the sliding ring. An empty space between the engaged gear teeth is provided to create some room for absorbing interference between the engaged gear teeth because the interference is likely to occur between the engaged gear teeth when the opposing gear teeth 230 are completely superimposed. This space may be introduced by forming a recess in each gear tooth 230 of the stationary plate 210, the sliding ring 220, or both, and the recess may be formed in the bottom land between the gear teeth 230.

FIG. 11 illustrates an example in which the operating clearance is adjusted in four levels. When the top land or the highest tier of each gear tooth 230 of the stationary plate is in contact with the top land or the highest tier of each gear tooth 230 of the sliding ring, the distance between the thrust bearing 20 and the first cylinder housing 113 is maximized. In other words, in the embodiment of FIG. 11, when the highest tier of each gear tooth of the stationary plate is in contact with the highest tier of each gear tooth of the sliding ring, the amount of the adjusted operating clearance is maximum. In the embodiment of FIG. 11, the operating clearance can be finely adjusted even further in three more levels.

The operating clearance varying device 200 described above basically functions to adjust the operating clearance, e.g., the distance between the first hydraulic cylinder 112 and the thrust collar 14 according to operating conditions. The operating clearance varying device 200 can also function as the cylinder locking device 12 described above. That is, when the operating clearance varying device 200 is operated such that the thrust bearing 20 mounted with the stationary plate 210 is brought close to or brought into contact with the thrust collar 14 (See FIGS. 10B, 11B, and 11C), although failures or errors occur in the first hydraulic cylinder 112 and the first hydraulic cylinder 112 enters an inoperative state, the thrust bearing 20 can be locked to a predetermined position and the locked state can be maintained.

As described above, the operating clearance varying device 200 of the present disclosure can be referred to as a mechanical stepper. Even though the hydraulic pressure is used to rotate the sliding ring 220 in the embodiments, the availability of an additional hydraulic circuit independent of the hydraulic circuit dedicated to the blade tip clearance control apparatus 100 may make it possible to prepare for emergency situations. Furthermore, since the position of the thrust bearing 20 is fixed by the mechanical operation of changing the meshing state of the gear teeth 230, the reliability of the operation in emergency situations may be improved.

FIG. 12 illustrates an example of a ring drive mechanism 300 used to rotate the sliding ring 220.

The sliding rings 220 are respectively fitted on the outer circumferential surfaces of the first cylinder housing 113 and the second cylinder housing 115 in a manner of being rotatable forward and in the reverse direction by a predetermined angle or smaller. As described above, each of the sliding rings 220 is mounted on a first surface of a corresponding one of the first cylinder housing 113 and the second cylinder housing 115 in which the first surface is a surface facing the stationary plate 210, and the gear teeth 230 are formed to project toward the stationary plate 210 from the sliding ring 220.

FIG. 12 illustrates the ring drive mechanism 300 as an example of a hydraulic ring drive mechanism 310 using a hydraulic cylinder. Each of the sliding rings 220 is rotated about a fixed point or a fixed rotation center of a corresponding one of the first cylinder housing 113 and the second cylinder housing 115. Normally, the rotation center of each of the sliding rings 220 may coincide with the center of a corresponding one of the first hydraulic cylinder and the second hydraulic cylinder. There are various existing techniques for mounting the sliding rings 220 on the respective cylinder housings 113 and 115. For example, a structure where each of the sliding rings 220 is rotatably mounted in an annular groove formed on the outer surface of a corresponding one of the first cylinder housing 113 and the second cylinder housing 115 may be used.

As described above, when each of the sliding rings 220 is mounted in a manner of performing only rotary motion along a predetermined circular path defined on a corresponding one of the cylinder housings 113 and 115, the design of the ring drive mechanism 300 that functions to rotate the sliding ring 220 may be simplified. This embodiment is illustrated in FIG. 12.

Ring-driving hydraulic cylinders 312 are rotatably mounted on arbitrary fixtures, respectively, including the cylinder housings 113 and 115. A free end of a retractable cylinder rod 314 of each ring-driving hydraulic cylinder 312 is connected in a pivoting manner to an end of a radially projecting arm handle 316 which is fixed to the sliding ring 220 at an end thereof. In this structure, when the cylinder rod 314 of the ring-driving hydraulic cylinder 312 linearly reciprocates (e.g., advances and retreats), the sliding ring 220 rotates along the predetermined circular path defined on the surface of a corresponding one of the cylinder housings 113 and 115. Since the sliding ring 220 performs rotary motion only along one trajectory, thus having one degree of freedom in motion when a force is applied to the sliding ring 220 in an arbitrary direction, which does not pass through the rotation center of the sliding ring 220, the force is easily converted into the rotary motion of the sliding ring 220.

Referring to FIG. 12, the sliding ring 220 is rotated clockwise when the cylinder rod 314 advances and is rotated counterclockwise when the cylinder rod 314 retreats. Since the rotation angle of the sliding ring 220 is substantially proportional to the distance of the advancing motion (e.g., a forward moving distance) and the distance of the retreating motion (e.g., a reverse moving distance or a reverse moving distance), the rotation angle of the sliding ring 220 can be adjusted by controlling the forward moving distance and the reverse moving distance of the cylinder rod 314. Therefore, it may be possible to apply the hydraulic ring drive mechanism 310 utilizing a hydraulic cylinder to a multi-level clearance adjusting structure where each of the gear teeth 230 has an inclined tiered face 232 as illustrated in FIG. 11.

FIG. 13 illustrates one embodiment of an electric ring drive mechanism 320 using an electric motor 322 to rotate the sliding ring instead of a hydraulic cylinder. The mounting structure of the sliding ring 220 is the same as the previous embodiment described above except that the electric motor 322 is used as a power source for rotating the sliding ring 220 instead of the hydraulic cylinder.

The electric ring drive mechanism 320 uses a rack and pinion mechanism. To this end, the sliding ring 220 is constructed of a ring gear 324 which is a kind of rack gear. The ring gear 324 may be of either an internal gear type (having teeth on its inner circumference) or an external gear type (having teeth on its outer circumference), which can be appropriately selected according to the design conditions. FIG. 13 illustrates an example in which an internal ring gear 324' is applied to the second hydraulic cylinder 114 (disposed on the left side of the figure) and an external ring gear 324" is applied to the first hydraulic cylinder 112 (disposed on the right side of the figure).

A pinion gear 326, which meshes with the ring gear 324 of the sliding ring 220 to rotate the sliding ring 220, is fitted on a rotary shaft 323 of the electric motor 322. Since the rotation angle of the sliding ring 220 is exactly proportional to the rotation angle of the pinion gear 326, the electric ring drive mechanism illustrated in FIG. 13 is relatively easy to control the rotation angle of the sliding ring 220 as compared to the hydraulic ring drive mechanism 310 illustrated in FIG. 12.

In the embodiment illustrated in FIG. 13, the electric motors 322 are fixedly mounted on the outer surfaces of the cylinder housings 113 and 115, respectively. Therefore, in order to rotate the pinion gears 326 meshed with the ring gears 324 of the sliding rings 220 disposed inside the cylinder housings 113 and 115, respectively, the rotary shafts 323 of the electric motors 322 rotate corresponding shafts 328 extending through the cylinder housings 113 and 115, respectively. One end (e.g., first end) of the shaft 328 is engaged with the pinion gear 326, and the other end (e.g., second end) of the shaft 328 is connected with the rotary shaft 323 of the electric motor 322.

FIG. 13 illustrates an operation method where in order to rotate the shaft 328, the rotary shaft 323 of the electric motor 322 is coupled with the second end of the shaft 328 by spur gears 329. The spur gear 329 is advantageous in that the torque of the electric motor 322 can be increased (e.g., the output power of the electric motor is reduced) by adjusting a gear ratio of two spur gears 329 (e.g., a ratio of the number of teeth of one spur gear with respect to the number of teeth of the other spur gear 329), and the rotation angle of the sliding gear can be finely adjusted. One embodiment in which the electric motor 322 and the pinion gear 326 are directly coupled with each other is also possible. In this case, the shaft 328 may replace the rotary shaft 323 of the electric motor 322.

Although, in the embodiment of FIG. 13, the electric motor 322 is used as a basic ring drive mechanism, it is apparent that any other kind of driving device that can generate a rotational force, for example, a hydraulic motor can be used instead of the electric motor 322. Therefore, it should be understood that the embodiment of FIG. 13 can be modified such that the electric ring drive mechanism 320 is replaced by the hydraulic ring drive mechanism 300 which utilizes a rack and pinion mechanism. Thus, the electric ring drive mechanism 320 should not be construed as being limited to a drive mechanism operating on electric power.

The embodiments that have been described herein above are merely illustrative of the technical idea of the present disclosure, and thus various modifications, changes, alterations, substitutions, subtractions, and additions may also be made by those skilled in the art without departing from the gist of the present disclosure. The embodiments disclosed in the present disclosure are not intended to limit the scope of the present disclosure and the technical spirit of the present disclosure should not be construed as being limited to the embodiments. The protection scope of the present disclosure should be construed as defined in the following claims, and it is apparent that all technical ideas equivalent thereto fall within the scope of the present disclosure.

What is claimed is:

1. A blade tip clearance control apparatus comprising:
a rotor comprising a thrust collar, a pair of thrust bearings axially supporting the thrust collar, and a plurality of radially extending blades;
a hydraulic clearance control device comprising a first hydraulic cylinder configured to move one of the pair of thrust bearings in a forward axial direction and a second hydraulic cylinder configured to move a remaining one of the pair of thrust bearings in a reverse axial direction; and
a cylinder locking device comprising a first locking device configured to restrict a forward moving distance of the first hydraulic cylinder and a second locking device configured to restrict a reverse moving distance of the second hydraulic cylinder.

2. The blade tip clearance control apparatus according to claim 1, wherein the cylinder locking device is a stopper member for restricting a movement range of each of the first hydraulic cylinder and the second hydraulic cylinder, and is operated by an actuator that linearly actuates the stopper member forward or backward.

3. The blade tip clearance control apparatus according to claim 1, wherein the first locking device is operated when a reverse thrust is exerted on the rotor.

4. The blade tip clearance control apparatus according to claim 3, wherein the second locking device is operated when a forward thrust is exerted on the rotor.

5. The blade tip clearance control apparatus according to claim 4, wherein a hydraulic pressure is continuously applied to the first hydraulic cylinder or the second hydraulic cylinder during operation of the first locking device or the second locking device.

6. The blade tip clearance control apparatus according to claim 4, wherein a hydraulic pressure is applied to the first hydraulic cylinder or the second hydraulic cylinder only for a certain period of time when the first locking device or the second locking device is activated or deactivated.

7. The blade tip clearance control apparatus according to claim 1, wherein the second locking device operates during a start-up session or a shut-down session of a gas turbine.

8. The blade tip clearance control apparatus according to claim 1, further comprising a main hydraulic circuit device and an emergency hydraulic circuit device respectively connected in parallel to hydraulic lines connected to the first hydraulic cylinder and the second hydraulic cylinder, respectively.

9. The blade tip clearance control apparatus according to claim 8, wherein the emergency hydraulic circuit device comprises a second forward control valve configured to operate the first hydraulic cylinder and a second reverse control valve configured to operate the second hydraulic cylinder, and
wherein the blade tip clearance control apparatus further comprises a second hydraulic pump and a third hydraulic pump connected in parallel to the second forward control valve and the second reverse control valve, respectively.

10. The blade tip clearance control apparatus according to claim 9, wherein the second hydraulic pump operates on AC power and the third hydraulic pump operates on DC power.

11. The blade tip clearance control apparatus according to claim 10, further comprising a DC power storage device configured to supply the DC power to operate the third hydraulic pump.

12. The blade tip clearance control apparatus according to claim 1, wherein the cylinder locking device comprising the first locking device and the second locking device serves as an operating clearance varying device configured to adjust an operating clearance of each of the first and second hydraulic cylinders with respect to the thrust collar.

13. The blade tip clearance control apparatus according to claim 12, wherein the operating clearance varying devices are provided respectively in the first hydraulic cylinder and the second hydraulic cylinder,
wherein each of the operating clearance varying devices comprises a stationary plate fixedly mounted on a second surface of a corresponding one of the thrust bearings, the second surface not facing the thrust collar, and a sliding ring configured to rotate in a forward circumferential direction and a reverse circumferential direction while being fitted on an outer surface of a corresponding one of the first cylinder housing and the second cylinder housing in which the first hydraulic cylinder and the second hydraulic cylinder are respectively accommodated, and
wherein gear teeth projecting from a circumference of the stationary plate and gear teeth projecting from a circumference of the sliding ring come into contact with each other, thereby maintaining the operating clearance.

14. The blade tip clearance control apparatus according to claim 13, wherein the stationary plate and the sliding ring are in a first contact state in which top lands of the gear teeth of one party among the stationary plate and the sliding ring are superimposed on bottom lands of the gear teeth of the other party among the stationary plate and the sliding ring or a second contact state in which the top lands of the gear teeth of the stationary plate are in contact with the top lands of the gear teeth of the sliding ring.

15. The blade tip clearance control apparatus according to claim 14, wherein the gear teeth of the stationary plate and the gear teeth of the sliding ring have a trapezoid shape with a flat top.

16. The blade tip clearance control apparatus according to claim 13, wherein the gear teeth of the stationary plate have faces inclined in a first direction and the gear teeth of the sliding ring have faces inclined in a second direction which is opposite to the first direction, wherein each of the inclined faces has a multi-tier stair-step shape, and wherein the inclined faces of the gear teeth of the stationary plate and the inclined faces of the gear teeth of the sliding ring are correspondingly shaped to be engaged with each other.

17. The blade tip clearance control apparatus according to claim 16, wherein an inclination angle of the inclined face of the gear tooth of the stationary plate and an inclination angle of the inclined face of the gear tooth of the sliding ring add up to 90°.

18. The blade tip clearance control apparatus according to claim 16, wherein the gear tooth of the stationary plate, the gear tooth of the sliding ring, or both have a recess in the bottom land thereof.

19. The blade tip clearance control apparatus according to claim 14, wherein the operating clearance is controlled by performing a series of control processes of briefly operating the first hydraulic cylinder or the second hydraulic cylinder to cancel a pressing force applied to the sliding ring by the stationary plate, rotating the sliding ring by a predetermined angle to switch a contact state between the gear teeth of the stationary plate and the gear teeth of the sliding ring between the first contact state and the second contact state, and returning the first hydraulic cylinder or the second hydraulic cylinder to an original position.

20. The blade tip clearance control apparatus according to claim 16, wherein the operating clearance is controlled by performing a series of control processes of briefly operating the first hydraulic cylinder or the second hydraulic cylinder to cancel a pressing force applied to the sliding ring by the stationary plate, rotating the sliding ring by a predetermined angle to switch a contact state between the gear teeth of the stationary plate and the gear teeth of the sliding ring between the first contact state and the second contact state, and returning the first hydraulic cylinder or the second hydraulic cylinder to an original position.

21. The blade tip clearance control apparatus according to claim 13, wherein each of the sliding rings is rotated about a fixed point on a corresponding one of the first cylinder housing and the second cylinder housing.

22. The blade tip clearance control apparatus according to claim 21, further comprising a ring drive mechanism configured to rotate the sliding ring, and the ring drive mechanism is a hydraulic ring drive mechanism comprising a ring-driving hydraulic cylinder which exerts a force on the sliding ring in an arbitrary direction which does not pass through a rotation center of the sliding ring.

23. The blade tip clearance control apparatus according to claim 22, wherein the ring-driving hydraulic cylinders are rotatably mounted on fixtures which respectively include the first cylinder housing and the second cylinder housing and exist around the rotor, respectively, and wherein a free end of a retractable cylinder rod of each of the ring-driving hydraulic cylinders is pivotably coupled with a radially projecting arm handle fixed to the sliding ring.

24. The blade tip clearance control apparatus according to claim 23, wherein a rotation angle of the sliding ring is adjusted by controlling a distance of advancing motion and a distance of retreating motion of the cylinder rod.

25. The blade tip clearance control apparatus according to claim 21, further comprising a ring drive mechanism configured to rotate the sliding ring, wherein the ring drive mechanism is an electric ring drive mechanism comprising an electric motor provided with a pinion gear configured to rotate a ring gear formed along a circumference of the sliding ring.

26. The blade tip clearance control apparatus according to claim 25, wherein the ring gear and the pinion gear mesh with each other in an inscribed manner or a circumscribed manner.

27. The blade tip clearance control apparatus according to claim 25, wherein the electric motors are fixedly mounted on outer surfaces of the first cylinder housing and three second cylinder housing, respectively, and wherein a rotary shaft of each of the electric motors functions to rotate a shaft installed to extend through a corresponding one of the first cylinder housing and the second cylinder housing, thereby rotating the pinion gears.

28. The blade tip clearance control apparatus according to claim 27, wherein the rotary shaft of the electric motor is coupled with the shaft by a pair of spur gears.

29. The blade tip clearance control apparatus according to claim 28, wherein a gear ratio which is a ratio of the number of teeth of one of the spur gears with respect to the number of teeth of the other spur gear corresponds to a speed reduction rate of the shaft.

\* \* \* \* \*